Nov. 26, 1929. H. A. STEPHENS 1,737,064
SHOCK ABSORBER AND BUMPER FOR THE TONGUES AND
DOUBLETREE EQUALIZERS OF CULTIVATORS
Filed July 30, 1928
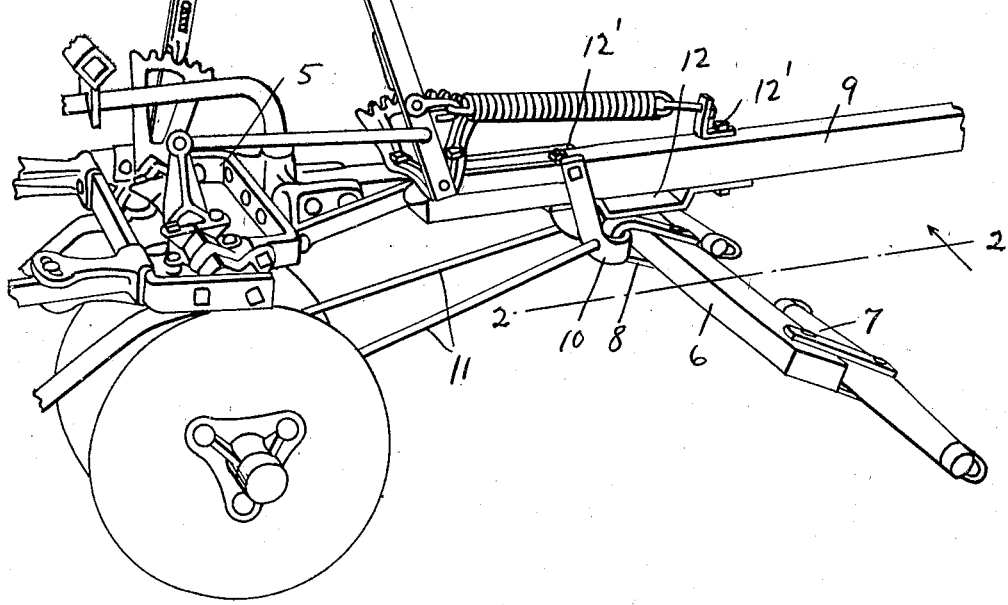
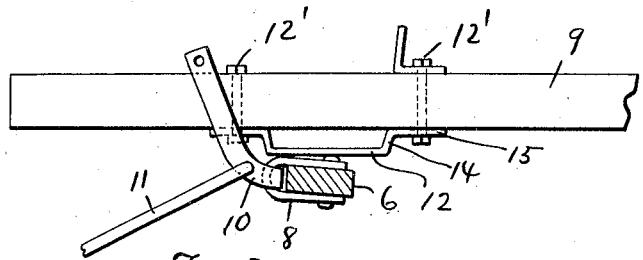
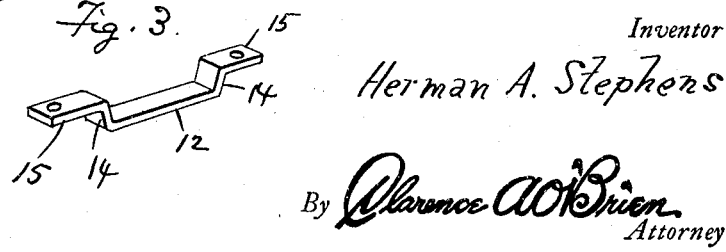
Inventor
Herman A. Stephens
By Clarence A. O'Brien
Attorney Patented Nov. 26, 1929

1,737,064

UNITED STATES PATENT OFFICE

HERMAN A. STEPHENS, OF STERLING, COLORADO

SHOCK ABSORBER AND BUMPER FOR THE TONGUES AND DOUBLETREE EQUALIZERS OF CULTIVATORS

Application filed July 30, 1928. Serial No. 296,218.

The present invention relates to a device for use on a go dig, particularly designed for farm use in cultivating corn, when the corn is planted by a lister.

The device absorbs the jerking and bumping which takes place between the axle and the double tree equalizer of the machine which is very hard upon the horses drawing the machine.

Another very important object of the invention resides in the provision of a device of this nature which is exceptionally simple in its construction, inexpensive to manufacture, strong and durable, and throughly efficient and reliable in use.

With the above and numerous other objects in view, as will appear as the description proceeds, the invention resides in certain novel features of construction, and in the combination and arrangement of parts as will be hereinafter more fully described and claimed.

In the drawing:

Figure 1 is a perspective view of a machine with my device mounted on the tongue thereof.

Figure 2 is a fragmentary detail view of the tongue, showing the device in place, and Figure 3 is a perspective view of the device.

Referring to the drawing in detail, it will be seen that the numeral 5 denotes the cultivating apparatus, having the usual tongue 9, double tree or evener 6, clevis 8, whiffletree 7, double tree evener support 10, and pull rods 11. The tongue 9 is rigidly connected to the frame of the machine. The support 10 is pivotally connected to the tongue so as to be capable of swinging in the direction of the length of the tongue while the rods 11 are interposed between and connected to the support 10 and the axle of the cultivator inside of the wheels illustrated. My device is preferably made of iron or steel and is fastened to the tongue with bolts or in any other suitable manner. This device is disposed just above the clevis 8 and is adapted to be abutted by the clevis 8 when the draft animals pull from the whiffletrees 7.

Specifically described, my improved device includes a bar having a straight central portion 12 merging into rising extensions 14, which in turn merge into extensions 15, in parallelism with the straight portion 12 and extending in opposite directions therefrom. The fastening elements 12 engage the end portions 15 underneath the tongue 9 as is clearly illustrated in Figure 2, so that the clevis 8 will abut the straight intermediate portion 12 as is clearly illustrated in Figure 1.

In the absence of my improvement, the wheels of the cultivator riding over rough soil cause the support 10 to move and hit the tongue 9 and jerk on the necks of the draft animals. When, however, the bar 12 is provided at the underside of the tongue 9 and it is opposed to the clevis 8, as clearly shown in Figure 1, the striking of the element 10 against the tongue 9 will be averted as will also the jerking on the necks of the draft animals. This will be better understood when it is stated that at all times the clevis 8 is in engagement with the bar 12 and that all thrust of the clevis 8 received from the element 10 is immediately imposed on the bar 12.

The present embodiment of the invention has been disclosed in considerable detail, for the purpose of exemplification, because it contains the features of advantage enumerated as desirable in the statement of the invention and the above description.

It will be apparent that changes in the details of construction, in the sizes and dimensions and proportions of parts may be resorted to, without departing from the spirit or scope of the invention as hereinafter claimed or sacrificing any of its advantages.

Having thus described my invention, what I claim as new is:

In a cultivator, the combination with a frame, wheels supporting said frame, a tongue rigidly connected to the frame, a clevis of U-shape disposed below and spaced from the tongue, a U-shaped clevis support interlocked with the bight of the clevis and swingably connected with and pendent from the tongue, pull rods interposed between and connected to the wheel bearing portion of the cultivator and the said clevis support, and a double tree arranged below the tongue in spaced relation thereto and disposed in and connected to the clevis; of a bar having an imperforate longitudinal portion spaced below the tongue and opposed to and engaged by the clevis and also having end portions arranged against and connected to the tongue.

In testimony whereof I affix my signature.

HERMAN A. STEPHENS.